US009461363B2

(12) United States Patent
Ikemoto

(10) Patent No.: US 9,461,363 B2
(45) Date of Patent: Oct. 4, 2016

(54) COMMUNICATION TERMINAL AND INFORMATION PROCESSING SYSTEM

(75) Inventor: Nobuo Ikemoto, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 484 days.

(21) Appl. No.: 13/432,002

(22) Filed: Mar. 28, 2012

(65) Prior Publication Data

US 2012/0182128 A1 Jul. 19, 2012

Related U.S. Application Data

(63) Continuation of application No. PCT/JP2010/069416, filed on Nov. 1, 2010.

(30) Foreign Application Priority Data

Nov. 4, 2009 (JP) ................................ 2009-253228

(51) Int. Cl.

| | |
|---|---|
| ***H04Q 5/22*** | (2006.01) |
| ***H01Q 7/00*** | (2006.01) |
| ***H01Q 1/22*** | (2006.01) |
| ***H01Q 1/38*** | (2006.01) |
| ***H01Q 9/16*** | (2006.01) |

(52) U.S. Cl.

CPC .............. *H01Q 7/00* (2013.01); *H01Q 1/2208* (2013.01); *H01Q 1/2216* (2013.01); *H01Q 1/38* (2013.01); *H01Q 9/16* (2013.01)

(58) Field of Classification Search

CPC .... H04Q 5/22; H01Q 1/2208; H01Q 1/2216; H01Q 9/16; H01Q 7/00; H01Q 1/38; G06K 7/0008; G06K 19/0723; G06K 19/07749; G06K 2017/0045; G07C 9/00111

USPC ........................................................ 340/10.1

See application file for complete search history.

(56) References Cited

U.S. PATENT DOCUMENTS

| | | | |
|---|---|---|---|
| 3,364,564 | A | 1/1968 | Kurtz et al. |
| 4,794,397 | A | 12/1988 | Ohe et al. |

(Continued)

FOREIGN PATENT DOCUMENTS

| | | | |
|---|---|---|---|
| CA | 2 279 176 | A1 | 7/1998 |
| CN | 1831841 | A | 9/2006 |

(Continued)

OTHER PUBLICATIONS

Official communication issued in counterpart European Application No. 08 77 7758, dated on Jun. 30, 2009.

(Continued)

*Primary Examiner* — Omer S Khan
(74) *Attorney, Agent, or Firm* — Keating & Bennett, LLP

(57) ABSTRACT

An information processing system includes a reader/writer, a communication terminal, and a wireless IC tag. The communication terminal includes an electric field-type first antenna unit, a magnetic field-type second antenna unit, and a connection unit electrically connecting the first and second antenna units and to each other, and is housed within a pen housing. The first antenna unit is coupled to an antenna of the reader/writer through an electric field, and the second antenna unit is coupled to the wireless IC tag through a magnetic field. By causing the second antenna unit to be adjacent to the wireless IC tag, the reader/writer and the wireless IC tag communicate with each other.

10 Claims, 10 Drawing Sheets

(56) References Cited

U.S. PATENT DOCUMENTS

| | | | |
|---|---|---|---|
| 5,232,765 | A | 8/1993 | Yano et al. |
| 5,253,969 | A | 10/1993 | Richert |
| 5,337,063 | A | 8/1994 | Takahira |
| 5,374,937 | A | 12/1994 | Tsunekawa et al. |
| 5,399,060 | A | 3/1995 | Richert |
| 5,491,483 | A | 2/1996 | D'Hont |
| 5,528,222 | A | 6/1996 | Moskowitz et al. |
| 5,757,074 | A | 5/1998 | Matloubian et al. |
| 5,854,480 | A | 12/1998 | Noto |
| 5,903,239 | A | 5/1999 | Takahashi et al. |
| 5,936,150 | A | 8/1999 | Kobrin et al. |
| 5,955,723 | A | 9/1999 | Reiner |
| 5,995,006 | A | 11/1999 | Walsh |
| 6,104,311 | A | 8/2000 | Lastinger |
| 6,107,920 | A | 8/2000 | Eberhardt et al. |
| 6,172,608 | B1 | 1/2001 | Cole |
| 6,181,287 | B1 | 1/2001 | Beigel |
| 6,190,942 | B1 | 2/2001 | Wilm et al. |
| 6,243,045 | B1 | 6/2001 | Ishibashi |
| 6,249,258 | B1 | 6/2001 | Bloch et al. |
| 6,259,369 | B1 | 7/2001 | Monico |
| 6,271,803 | B1 | 8/2001 | Watanabe et al. |
| 6,335,686 | B1 | 1/2002 | Goff et al. |
| 6,362,784 | B1 | 3/2002 | Kane et al. |
| 6,367,143 | B1 | 4/2002 | Sugimura |
| 6,378,774 | B1 | 4/2002 | Emori et al. |
| 6,400,326 | B1 * | 6/2002 | Green, Jr. .............. H01Q 1/241 343/711 |
| 6,406,990 | B1 | 6/2002 | Kawai |
| 6,448,874 | B1 | 9/2002 | Shiino et al. |
| 6,452,563 | B1 | 9/2002 | Porte |
| 6,462,716 | B1 | 10/2002 | Kushihi |
| 6,542,050 | B1 | 4/2003 | Arai et al. |
| 6,600,459 | B2 | 7/2003 | Yokoshima et al. |
| 6,634,564 | B2 | 10/2003 | Kuramochi |
| 6,664,645 | B2 | 12/2003 | Kawai |
| 6,763,254 | B2 | 7/2004 | Nishikawa |
| 6,812,707 | B2 | 11/2004 | Yonezawa et al. |
| 6,828,881 | B2 | 12/2004 | Mizutani et al. |
| 6,837,438 | B1 | 1/2005 | Takasugi et al. |
| 6,861,731 | B2 | 3/2005 | Buijsman et al. |
| 6,927,738 | B2 | 8/2005 | Senba et al. |
| 6,956,481 | B1 | 10/2005 | Cole |
| 6,963,729 | B2 | 11/2005 | Uozumi |
| 7,088,249 | B2 | 8/2006 | Senba et al. |
| 7,088,307 | B2 | 8/2006 | Imaizumi |
| 7,112,952 | B2 | 9/2006 | Arai et al. |
| 7,119,693 | B1 | 10/2006 | Devilbiss |
| 7,129,834 | B2 | 10/2006 | Naruse et al. |
| 7,248,221 | B2 | 7/2007 | Kai et al. |
| 7,250,910 | B2 | 7/2007 | Yoshikawa et al. |
| 7,276,929 | B2 | 10/2007 | Arai et al. |
| 7,317,396 | B2 | 1/2008 | Ujino |
| 7,405,664 | B2 | 7/2008 | Sakama et al. |
| 2002/0011967 | A1 | 1/2002 | Goff et al. |
| 2002/0015002 | A1 | 2/2002 | Yasukawa et al. |
| 2002/0044092 | A1 | 4/2002 | Kushihi |
| 2002/0067316 | A1 | 6/2002 | Yokoshima et al. |
| 2002/0093457 | A1 | 7/2002 | Hamada et al. |
| 2003/0006901 | A1 | 1/2003 | Kim et al. |
| 2003/0020661 | A1 | 1/2003 | Sato |
| 2003/0045324 | A1 | 3/2003 | Nagumo et al. |
| 2003/0052783 | A1 * | 3/2003 | Sitzman ..................... 340/572.7 |
| 2003/0169153 | A1 | 9/2003 | Muller |
| 2004/0001027 | A1 | 1/2004 | Killen et al. |
| 2004/0026519 | A1 | 2/2004 | Usami et al. |
| 2004/0056823 | A1 | 3/2004 | Zuk et al. |
| 2004/0066617 | A1 | 4/2004 | Hirabayashi et al. |
| 2004/0217867 | A1 | 11/2004 | Bridgelall et al. |
| 2004/0217915 | A1 | 11/2004 | Imaizumi |
| 2004/0219956 | A1 | 11/2004 | Iwai et al. |
| 2004/0227673 | A1 | 11/2004 | Iwai et al. |
| 2004/0252064 | A1 | 12/2004 | Yuanzhu |
| 2005/0092836 | A1 | 5/2005 | Kudo |
| 2005/0099337 | A1 | 5/2005 | Takei et al. |
| 2005/0125093 | A1 | 6/2005 | Kikuchi et al. |
| 2005/0134460 | A1 | 6/2005 | Usami |
| 2005/0134506 | A1 | 6/2005 | Egbert |
| 2005/0138798 | A1 | 6/2005 | Sakama et al. |
| 2005/0140512 | A1 | 6/2005 | Sakama et al. |
| 2005/0232412 | A1 | 10/2005 | Ichihara et al. |
| 2005/0236623 | A1 | 10/2005 | Takechi et al. |
| 2005/0275539 | A1 | 12/2005 | Sakama et al. |
| 2006/0001138 | A1 | 1/2006 | Sakama et al. |
| 2006/0032926 | A1 | 2/2006 | Baba et al. |
| 2006/0044192 | A1 | 3/2006 | Egbert |
| 2006/0055531 | A1 | 3/2006 | Cook et al. |
| 2006/0055601 | A1 | 3/2006 | Kameda et al. |
| 2006/0071084 | A1 | 4/2006 | Detig et al. |
| 2006/0109185 | A1 | 5/2006 | Iwai et al. |
| 2006/0145872 | A1 | 7/2006 | Tanaka et al. |
| 2006/0158380 | A1 | 7/2006 | Son et al. |
| 2006/0170606 | A1 | 8/2006 | Yamagajo et al. |
| 2006/0208899 | A1 | 9/2006 | Suzuki et al. |
| 2006/0214801 | A1 | 9/2006 | Murofushi et al. |
| 2006/0220871 | A1 | 10/2006 | Baba et al. |
| 2006/0244568 | A1 | 11/2006 | Tong et al. |
| 2006/0244676 | A1 | 11/2006 | Uesaka |
| 2006/0267138 | A1 | 11/2006 | Kobayashi |
| 2007/0004028 | A1 | 1/2007 | Lair et al. |
| 2007/0018893 | A1 | 1/2007 | Kai et al. |
| 2007/0040028 | A1 | 2/2007 | Kawamata |
| 2007/0052613 | A1 | 3/2007 | Gallschuetz et al. |
| 2007/0057854 | A1 | 3/2007 | Oodachi et al. |
| 2007/0069037 | A1 | 3/2007 | Kawai |
| 2007/0095911 | A1 | 5/2007 | Shimura et al. |
| 2007/0132591 | A1 | 6/2007 | Khatri |
| 2007/0164414 | A1 | 7/2007 | Dokai et al. |
| 2007/0194936 | A1 * | 8/2007 | Hoshina ..................... 340/572.8 |
| 2007/0200782 | A1 | 8/2007 | Hayama et al. |
| 2007/0229276 | A1 | 10/2007 | Yamagajo et al. |
| 2007/0247387 | A1 | 10/2007 | Kubo et al. |
| 2007/0252700 | A1 | 11/2007 | Ishihara et al. |
| 2007/0252703 | A1 | 11/2007 | Kato et al. |
| 2007/0285335 | A1 | 12/2007 | Bungo et al. |
| 2007/0290928 | A1 | 12/2007 | Chang et al. |
| 2008/0024156 | A1 | 1/2008 | Arai et al. |
| 2008/0070003 | A1 | 3/2008 | Nakatani et al. |
| 2008/0087990 | A1 | 4/2008 | Kato et al. |
| 2008/0143630 | A1 | 6/2008 | Kato et al. |
| 2008/0169905 | A1 | 7/2008 | Slatter |
| 2008/0184281 | A1 | 7/2008 | Ashizaki et al. |
| 2008/0238621 | A1 | 10/2008 | Rofougaran et al. |
| 2008/0272885 | A1 | 11/2008 | Atherton |
| 2009/0002130 | A1 | 1/2009 | Kato |
| 2009/0009007 | A1 | 1/2009 | Kato et al. |
| 2009/0015383 | A1 * | 1/2009 | Stewart ........................ 340/10.3 |
| 2009/0021352 | A1 | 1/2009 | Kataya et al. |
| 2009/0021374 | A1 * | 1/2009 | Stagg ......................... 340/572.1 |
| 2009/0021446 | A1 | 1/2009 | Kataya et al. |
| 2009/0029675 | A1 * | 1/2009 | Steinmetz .............. H04K 3/415 455/410 |
| 2009/0065594 | A1 | 3/2009 | Kato et al. |
| 2009/0068426 | A1 | 3/2009 | Nishizawa |
| 2009/0109102 | A1 | 4/2009 | Dokai et al. |
| 2009/0146783 | A1 * | 6/2009 | Forster ......................... 340/10.1 |
| 2009/0160719 | A1 | 6/2009 | Kato et al. |
| 2009/0201116 | A1 | 8/2009 | Orihara |
| 2009/0224061 | A1 | 9/2009 | Kato et al. |
| 2009/0231106 | A1 | 9/2009 | Okamura |
| 2009/0262041 | A1 | 10/2009 | Ikemoto et al. |
| 2009/0266900 | A1 | 10/2009 | Ikemoto et al. |
| 2009/0278687 | A1 | 11/2009 | Kato |
| 2009/0321527 | A1 | 12/2009 | Kato et al. |
| 2010/0103058 | A1 | 4/2010 | Kato et al. |
| 2010/0182210 | A1 | 7/2010 | Ryou et al. |
| 2010/0308118 | A1 | 12/2010 | Kataya et al. |
| 2011/0031320 | A1 | 2/2011 | Kato et al. |

(56) References Cited

U.S. PATENT DOCUMENTS

| | | | |
|---|---|---|---|
| 2011/0063184 A1 | 3/2011 | Furumura et al. | |
| 2012/0169472 A1 | 7/2012 | Ikemoto | |

FOREIGN PATENT DOCUMENTS

| | | | |
|---|---|---|---|
| CN | 101236771 | A | 8/2008 |
| CN | 101467221 | A | 6/2009 |
| CN | 102549838 | A | 7/2012 |
| DE | 20 2005 013 349 | U1 | 2/2006 |
| DE | 10 2006 057 369 | A1 | 6/2008 |
| EP | 0 694 874 | A2 | 1/1996 |
| EP | 0 848 448 | A2 | 6/1998 |
| EP | 0 948 083 | A2 | 10/1999 |
| EP | 0 977 145 | A2 | 2/2000 |
| EP | 1 010 543 | A1 | 6/2000 |
| EP | 1 085 480 | A1 | 3/2001 |
| EP | 1 160 915 | A2 | 12/2001 |
| EP | 1 170 795 | A2 | 1/2002 |
| EP | 1 193 793 | A2 | 4/2002 |
| EP | 1 227 540 | A1 | 7/2002 |
| EP | 1 280 232 | A1 | 1/2003 |
| EP | 1 280 350 | A1 | 1/2003 |
| EP | 1 343 223 | A1 | 9/2003 |
| EP | 1 357 511 | A2 | 10/2003 |
| EP | 1 547 753 | A1 | 6/2005 |
| EP | 1 548 872 | A1 | 6/2005 |
| EP | 1 626 364 | A2 | 2/2006 |
| EP | 1 701 296 | A1 | 9/2006 |
| EP | 1 703 589 | A1 | 9/2006 |
| EP | 1 742 296 | A1 | 1/2007 |
| EP | 1 744 398 | A1 | 1/2007 |
| EP | 1 837 798 | A2 | 9/2007 |
| EP | 1 840 802 | A1 | 10/2007 |
| EP | 1 841 005 | A1 | 10/2007 |
| EP | 1 865 574 | A1 | 12/2007 |
| EP | 1 887 652 | A1 | 2/2008 |
| EP | 1 956 526 | A1 | 8/2008 |
| EP | 1 976 056 | A1 | 10/2008 |
| EP | 1 988 491 | A1 | 11/2008 |
| EP | 1 988 601 | A1 | 11/2008 |
| EP | 1 993 170 | A1 | 11/2008 |
| EP | 2 009 738 | A1 | 12/2008 |
| EP | 2 012 258 | A1 | 1/2009 |
| EP | 2 096 709 | A1 | 9/2009 |
| EP | 2 148 449 | A1 | 1/2010 |
| EP | 2 166 617 | A1 | 3/2010 |
| EP | 2 251 934 | A1 | 11/2010 |
| EP | 2 330 684 | A1 | 6/2011 |
| GB | 2 305 075 | A | 3/1997 |
| GB | 2461443 | A | 1/2010 |
| JP | 50-143451 | A | 11/1975 |
| JP | 61-284102 | A | 12/1986 |
| JP | 62-127140 | U | 8/1987 |
| JP | 02-164105 | A | 6/1990 |
| JP | 02-256208 | A | 10/1990 |
| JP | 3-171385 | A | 7/1991 |
| JP | 03-503467 | A | 8/1991 |
| JP | 03-262313 | A | 11/1991 |
| JP | 04-150011 | A | 5/1992 |
| JP | 04-167500 | A | 6/1992 |
| JP | 04-096814 | U | 8/1992 |
| JP | 04-101168 | U | 9/1992 |
| JP | 04-134807 | U | 12/1992 |
| JP | 05-327331 | A | 12/1993 |
| JP | 6-53733 | A | 2/1994 |
| JP | 06-077729 | A | 3/1994 |
| JP | 06-177635 | A | 6/1994 |
| JP | 6-260949 | A | 9/1994 |
| JP | 07-183836 | A | 7/1995 |
| JP | 08-055725 | A | 2/1996 |
| JP | 08-056113 | A | 2/1996 |
| JP | 8-87580 | A | 4/1996 |
| JP | 08-88586 | A | 4/1996 |
| JP | 08-088586 | A | 4/1996 |
| JP | 08-176421 | A | 7/1996 |
| JP | 08-180160 | A | 7/1996 |
| JP | 08-279027 | A | 10/1996 |
| JP | 08-307126 | A | 11/1996 |
| JP | 08-330372 | A | 12/1996 |
| JP | 09-014150 | A | 1/1997 |
| JP | 09-035025 | A | 2/1997 |
| JP | 09-093029 | A | 4/1997 |
| JP | 9-93029 | A | 4/1997 |
| JP | 09-245381 | A | 9/1997 |
| JP | 09-252217 | A | 9/1997 |
| JP | 09-270623 | A | 10/1997 |
| JP | 09-284038 | A | 10/1997 |
| JP | 9-512367 | A | 12/1997 |
| JP | 10-069533 | A | 3/1998 |
| JP | 10-69533 | A | 3/1998 |
| JP | 10-505466 | A | 5/1998 |
| JP | 10-171954 | A | 6/1998 |
| JP | 10-173427 | A | 6/1998 |
| JP | 10-193849 | A | 7/1998 |
| JP | 10-193851 | A | 7/1998 |
| JP | 10-293828 | A | 11/1998 |
| JP | 10-334203 | A | 12/1998 |
| JP | 11-025244 | A | 1/1999 |
| JP | 11-039441 | A | 2/1999 |
| JP | 11-075329 | A | 3/1999 |
| JP | 11-085937 | A | 3/1999 |
| JP | 11-88241 | A | 3/1999 |
| JP | 11-102424 | A | 4/1999 |
| JP | 11-103209 | A | 4/1999 |
| JP | 11-149536 | A | 6/1999 |
| JP | 11-149537 | A | 6/1999 |
| JP | 11-149538 | A | 6/1999 |
| JP | 11-175678 | A | 7/1999 |
| JP | 11-219420 | A | 8/1999 |
| JP | 11-220319 | A | 8/1999 |
| JP | 11-282993 | A | 10/1999 |
| JP | 11-328352 | A | 11/1999 |
| JP | 11-331014 | A | 11/1999 |
| JP | 11-346114 | A | 12/1999 |
| JP | 11-515094 | A | 12/1999 |
| JP | 2000-21128 | A | 1/2000 |
| JP | 2000-021639 | A | 1/2000 |
| JP | 2000-022421 | A | 1/2000 |
| JP | 2000-059260 | A | 2/2000 |
| JP | 2000-085283 | A | 3/2000 |
| JP | 2000-090207 | A | 3/2000 |
| JP | 2000-132643 | A | 5/2000 |
| JP | 2000-137778 | A | 5/2000 |
| JP | 2000-137779 | A | 5/2000 |
| JP | 2000-137785 | A | 5/2000 |
| JP | 2000-148948 | A | 5/2000 |
| JP | 2000-172812 | A | 6/2000 |
| JP | 2000-209013 | A | 7/2000 |
| JP | 2000-222540 | A | 8/2000 |
| JP | 2000-510271 | A | 8/2000 |
| JP | 2000-242754 | A | 9/2000 |
| JP | 2000-243797 | A | 9/2000 |
| JP | 2000-251049 | A | 9/2000 |
| JP | 2000-261230 | A | 9/2000 |
| JP | 2000-276569 | A | 10/2000 |
| JP | 2000-286634 | A | 10/2000 |
| JP | 2000-286760 | A | 10/2000 |
| JP | 2000-311226 | A | 11/2000 |
| JP | 2000-321984 | A | 11/2000 |
| JP | 2000-349680 | A | 12/2000 |
| JP | 2001-10264 | A | 1/2001 |
| JP | 2001-028036 | A | 1/2001 |
| JP | 2001-043340 | A | 2/2001 |
| JP | 3075400 | U | 2/2001 |
| JP | 2001-66990 | A | 3/2001 |
| JP | 2001-76111 | A | 3/2001 |
| JP | 2001-084463 | A | 3/2001 |
| JP | 2001-101369 | A | 4/2001 |
| JP | 2001-505682 | A | 4/2001 |
| JP | 2001-168628 | A | 6/2001 |
| JP | 2001-188890 | A | 7/2001 |
| JP | 2001-240046 | A | 9/2001 |
| JP | 2001-240217 | A | 9/2001 |
| JP | 2001-256457 | A | 9/2001 |

(56) References Cited

FOREIGN PATENT DOCUMENTS

| | | | |
|---|---|---|---|
| JP | 2001-257292 | A | 9/2001 |
| JP | 2001-514777 | A | 9/2001 |
| JP | 2001-291181 | A | 10/2001 |
| JP | 2001-319380 | A | 11/2001 |
| JP | 2001-331976 | A | 11/2001 |
| JP | 2001-332923 | A | 11/2001 |
| JP | 2001-339226 | A | 12/2001 |
| JP | 2001-344574 | A | 12/2001 |
| JP | 2001-351083 | A | 12/2001 |
| JP | 2001-351084 | A | 12/2001 |
| JP | 2001-358527 | A | 12/2001 |
| JP | 2001-3521176 | A | 12/2001 |
| JP | 2002-024776 | A | 1/2002 |
| JP | 2002-026513 | A | 1/2002 |
| JP | 2002-32731 | A | 1/2002 |
| JP | 2002-063557 | A | 2/2002 |
| JP | 2002-505645 | A | 2/2002 |
| JP | 2002-076750 | A | 3/2002 |
| JP | 2002-76750 | A | 3/2002 |
| JP | 2002-111363 | A | 4/2002 |
| JP | 2002-150245 | A | 5/2002 |
| JP | 2002-157564 | A | 5/2002 |
| JP | 2002-158529 | A | 5/2002 |
| JP | 2002-175508 | A | 6/2002 |
| JP | 2002-183690 | A | 6/2002 |
| JP | 2002-185358 | A | 6/2002 |
| JP | 2002-204117 | A | 7/2002 |
| JP | 2002-521757 | A | 7/2002 |
| JP | 2002-522849 | A | 7/2002 |
| JP | 2002-230128 | A | 8/2002 |
| JP | 2002-232221 | A | 8/2002 |
| JP | 2002-246828 | A | 8/2002 |
| JP | 2002-252117 | A | 9/2002 |
| JP | 2002-259934 | A | 9/2002 |
| JP | 2002-280821 | A | 9/2002 |
| JP | 2002-298109 | A | 10/2002 |
| JP | 2002-308437 | A | 10/2002 |
| JP | 2002-319008 | A | 10/2002 |
| JP | 2002-319009 | A | 10/2002 |
| JP | 2002-319812 | A | 10/2002 |
| JP | 2002-362613 | A | 12/2002 |
| JP | 2002-366917 | A | 12/2002 |
| JP | 2002-373029 | A | 12/2002 |
| JP | 2002-373323 | A | 12/2002 |
| JP | 2002-374139 | A | 12/2002 |
| JP | 2003-006599 | A | 1/2003 |
| JP | 2003-016412 | A | 1/2003 |
| JP | 2003-022912 | A | 1/2003 |
| JP | 2003-026177 | A | 1/2003 |
| JP | 2003-030612 | A | 1/2003 |
| JP | 2003-037861 | A | 2/2003 |
| JP | 2003-44789 | A | 2/2003 |
| JP | 2003-046318 | A | 2/2003 |
| JP | 2003-58840 | A | 2/2003 |
| JP | 2003-067711 | A | 3/2003 |
| JP | 2003-069335 | A | 3/2003 |
| JP | 2003-076947 | A | 3/2003 |
| JP | 2003-76963 | A | 3/2003 |
| JP | 2003-78333 | A | 3/2003 |
| JP | 2003-078336 | A | 3/2003 |
| JP | 2003-085501 | A | 3/2003 |
| JP | 2003-085520 | A | 3/2003 |
| JP | 2003-87008 | A | 3/2003 |
| JP | 2003-87044 | A | 3/2003 |
| JP | 2003-099184 | A | 4/2003 |
| JP | 2003-099721 | A | 4/2003 |
| JP | 2003-110344 | A | 4/2003 |
| JP | 2003-132330 | A | 5/2003 |
| JP | 2003-134007 | A | 5/2003 |
| JP | 2003-155062 | A | 5/2003 |
| JP | 2003-158414 | A | 5/2003 |
| JP | 2003-168760 | A | 6/2003 |
| JP | 2003-179565 | A | 6/2003 |
| JP | 2003-187207 | A | 7/2003 |
| JP | 2003-187211 | A | 7/2003 |
| JP | 2003-188338 | A | 7/2003 |
| JP | 2003-188620 | A | 7/2003 |
| JP | 2003-198230 | A | 7/2003 |
| JP | 2003-209421 | A | 7/2003 |
| JP | 2003-216919 | A | 7/2003 |
| JP | 2003-218624 | A | 7/2003 |
| JP | 2003-099720 | A | 8/2003 |
| JP | 2003-233780 | A | 8/2003 |
| JP | 2003-242471 | A | 8/2003 |
| JP | 2003-243918 | A | 8/2003 |
| JP | 2003-249813 | A | 9/2003 |
| JP | 2003-529163 | A | 9/2003 |
| JP | 2003-288560 | A | 10/2003 |
| JP | 2003-309418 | A | 10/2003 |
| JP | 2003-317060 | A | 11/2003 |
| JP | 2003-331246 | A | 11/2003 |
| JP | 2003-332820 | A | 11/2003 |
| JP | 2003-536302 | A | 12/2003 |
| JP | 2004-040597 | A | 2/2004 |
| JP | 2004-505481 | A | 2/2004 |
| JP | 2006-025390 | A | 2/2004 |
| JP | 2004-082775 | A | 3/2004 |
| JP | 2004-88218 | A | 3/2004 |
| JP | 2004-93693 | A | 3/2004 |
| JP | 2004-096566 | A | 3/2004 |
| JP | 2004-126750 | A | 4/2004 |
| JP | 2004-127230 | A | 4/2004 |
| JP | 2004-140513 | A | 5/2004 |
| JP | 2004-163134 | A | 6/2004 |
| JP | 2004-213582 | A | 7/2004 |
| JP | 2004-519916 | A | 7/2004 |
| JP | 2004-234595 | A | 8/2004 |
| JP | 2004-253858 | A | 9/2004 |
| JP | 2004-527864 | A | 9/2004 |
| JP | 2004-280390 | A | 10/2004 |
| JP | 2004-282403 | A | 10/2004 |
| JP | 2004-287767 | A | 10/2004 |
| JP | 2004-295297 | A | 10/2004 |
| JP | 2004-297249 | A | 10/2004 |
| JP | 2004-297681 | A | 10/2004 |
| JP | 2004-304370 | A | 10/2004 |
| JP | 2004-319848 | A | 11/2004 |
| JP | 2004-326380 | A | 11/2004 |
| JP | 2004-334268 | A | 11/2004 |
| JP | 2004-336250 | A | 11/2004 |
| JP | 2004-343000 | A | 12/2004 |
| JP | 2004-362190 | A | 12/2004 |
| JP | 2004-362341 | A | 12/2004 |
| JP | 2004-362602 | A | 12/2004 |
| JP | 2005-5866 | A | 1/2005 |
| JP | 2005-18156 | A | 1/2005 |
| JP | 2005-033461 | A | 2/2005 |
| JP | 2005-124061 | A | 5/2005 |
| JP | 2005-128592 | A | 5/2005 |
| JP | 2005-129019 | A | 5/2005 |
| JP | 2005-135132 | A | 5/2005 |
| JP | 2005-136528 | A | 5/2005 |
| JP | 2005-137032 | A | 5/2005 |
| JP | 3653099 | B2 | 5/2005 |
| JP | 2005-165839 | A | 6/2005 |
| JP | 2005-167327 | A | 6/2005 |
| JP | 2005-167813 | A | 6/2005 |
| JP | 2005-190417 | A | 7/2005 |
| JP | 2005-191705 | A | 7/2005 |
| JP | 2005-192124 | A | 7/2005 |
| JP | 2002-042076 | A | 8/2005 |
| JP | 2005-210223 | A | 8/2005 |
| JP | 2005-210676 | A | 8/2005 |
| JP | 2005-210680 | A | 8/2005 |
| JP | 2005-217822 | A | 8/2005 |
| JP | 2005-229474 | A | 8/2005 |
| JP | 2005-236339 | A | 9/2005 |
| JP | 2005-244778 | A | 9/2005 |
| JP | 2005-252853 | A | 9/2005 |
| JP | 2005-275870 | A | 10/2005 |
| JP | 2005-284352 | A | 10/2005 |
| JP | 2005-284455 | A | 10/2005 |
| JP | 2005-293537 | A | 10/2005 |
| JP | 2005-295135 | A | 10/2005 |

(56) References Cited

FOREIGN PATENT DOCUMENTS

| | | | |
|---|---|---|---|
| JP | 2005-311205 | A | 11/2005 |
| JP | 2005-321305 | A | 11/2005 |
| JP | 2005-322119 | A | 11/2005 |
| JP | 2005-335755 | A | 12/2005 |
| JP | 2005-340759 | A | 12/2005 |
| JP | 2005-345802 | A | 12/2005 |
| JP | 2005-346820 | A | 12/2005 |
| JP | 2005-352858 | A | 12/2005 |
| JP | 2006-13976 | A | 1/2006 |
| JP | 2006-013976 | A | 1/2006 |
| JP | 2006-031766 | A | 2/2006 |
| JP | 2006-033312 | A | 2/2006 |
| JP | 2006-39902 | A | 2/2006 |
| JP | 2006-039947 | A | 2/2006 |
| JP | 2006-42059 | A | 2/2006 |
| JP | 2006-42097 | A | 2/2006 |
| JP | 2006-053833 | A | 2/2006 |
| JP | 2007-019905 | A | 2/2006 |
| JP | 2006-67479 | A | 3/2006 |
| JP | 2006-72706 | A | 3/2006 |
| JP | 2006-074348 | A | 3/2006 |
| JP | 2006-80367 | A | 3/2006 |
| JP | 2006-92630 | A | 4/2006 |
| JP | 2006-102953 | A | 4/2006 |
| JP | 2006-107296 | A | 4/2006 |
| JP | 2006-513594 | A | 4/2006 |
| JP | 2006-148462 | A | 6/2006 |
| JP | 2006-148518 | A | 6/2006 |
| JP | 2006-151402 | A | 6/2006 |
| JP | 2006-174151 | A | 6/2006 |
| JP | 2006-195795 | A | 7/2006 |
| JP | 2006-203187 | A | 8/2006 |
| JP | 2006-203852 | A | 8/2006 |
| JP | 2006-217000 | A | 8/2006 |
| JP | 2006-232292 | A | 9/2006 |
| JP | 2006-237674 | A | 9/2006 |
| JP | 2006-246372 | A | 9/2006 |
| JP | 2006-270212 | A | 10/2006 |
| JP | 2006-270681 | A | 10/2006 |
| JP | 2006-270766 | A | 10/2006 |
| JP | 2006-285911 | A | 10/2006 |
| JP | 2006-287659 | A | 10/2006 |
| JP | 2006-295879 | A | 10/2006 |
| JP | 2006-302219 | A | 11/2006 |
| JP | 2006-309401 | A | 11/2006 |
| JP | 2006-311239 | A | 11/2006 |
| JP | 2006-323481 | A | 11/2006 |
| JP | 2006-339964 | A | 12/2006 |
| JP | 2004-096618 | A | 1/2007 |
| JP | 2007-007888 | A | 1/2007 |
| JP | 2007-13120 | A | 1/2007 |
| JP | 2007-18067 | A | 1/2007 |
| JP | 2007-28002 | A | 2/2007 |
| JP | 2007-040702 | A | 2/2007 |
| JP | 2007-043535 | A | 2/2007 |
| JP | 2007-048126 | A | 2/2007 |
| JP | 2007-65822 | A | 3/2007 |
| JP | 2007-79687 | A | 3/2007 |
| JP | 2007-81712 | A | 3/2007 |
| JP | 2007-096768 | A | 4/2007 |
| JP | 2007-102348 | A | 4/2007 |
| JP | 2007-116347 | A | 5/2007 |
| JP | 2007-122542 | A | 5/2007 |
| JP | 2007-150642 | A | 6/2007 |
| JP | 2007-150868 | A | 6/2007 |
| JP | 2007-159083 | A | 6/2007 |
| JP | 2007-159129 | A | 6/2007 |
| JP | 2007-166133 | A | 6/2007 |
| JP | 2007-172369 | A | 7/2007 |
| JP | 2007-172527 | A | 7/2007 |
| JP | 2007-228325 | A | 9/2007 |
| JP | 2007-233597 | A | 9/2007 |
| JP | 2007-266999 | A | 10/2007 |
| JP | 2007-272264 | A | 10/2007 |
| JP | 2007-287128 | A | 11/2007 |
| JP | 2007-295557 | A | 11/2007 |
| JP | 2007-312350 | A | 11/2007 |
| JP | 2007-324865 | A | 12/2007 |
| JP | 2008-033716 | A | 2/2008 |
| JP | 2008-042910 | A | 2/2008 |
| JP | 2008-72243 | A | 3/2008 |
| JP | 2008-083867 | A | 4/2008 |
| JP | 2008-097426 | A | 4/2008 |
| JP | 4069958 | B2 | 4/2008 |
| JP | 2008-103691 | A | 5/2008 |
| JP | 2008-107947 | A | 5/2008 |
| JP | 2008-513888 | A | 5/2008 |
| JP | 2008-148345 | A | 6/2008 |
| JP | 2008-519347 | A | 6/2008 |
| JP | 2008-160874 | A | 7/2008 |
| JP | 2008-167190 | A | 7/2008 |
| JP | 2008-197714 | A | 8/2008 |
| JP | 2008-535372 | A | 8/2008 |
| JP | 2008-207875 | A | 9/2008 |
| JP | 2008-217406 | A | 9/2008 |
| JP | 2008-288915 | A | 11/2008 |
| JP | 2009-017284 | A | 1/2009 |
| JP | 2009-25870 | A | 2/2009 |
| JP | 2009-27291 | A | 2/2009 |
| JP | 2009-044715 | A | 2/2009 |
| JP | 3148168 | U | 2/2009 |
| JP | 2009-110144 | A | 5/2009 |
| JP | 2009-153166 | A | 7/2009 |
| JP | 2009-182630 | A | 8/2009 |
| JP | 2010-009196 | A | 1/2010 |
| JP | 2010-081571 | | 4/2010 |
| JP | 4609604 | B2 | 1/2011 |
| NL | 9100176 | A | 3/1992 |
| NL | 9100347 | A | 3/1992 |
| WO | 98/33142 | A1 | 7/1998 |
| WO | 99/67754 | A1 | 12/1999 |
| WO | 00/10122 | A2 | 2/2000 |
| WO | 01/95242 | A2 | 12/2001 |
| WO | 02/48980 | A1 | 6/2002 |
| WO | 02/061675 | A1 | 8/2002 |
| WO | 02/097723 | A1 | 12/2002 |
| WO | 03/079305 | A1 | 9/2003 |
| WO | 2004/036772 | A2 | 4/2004 |
| WO | 2004/070879 | A | 8/2004 |
| WO | 2004/072892 | A2 | 8/2004 |
| WO | 2005/073937 | A | 8/2005 |
| WO | 2005/091434 | A1 | 9/2005 |
| WO | 2005/115849 | A1 | 12/2005 |
| WO | 2006/045682 | A | 5/2006 |
| WO | 2006/048663 | A1 | 5/2006 |
| WO | 2006/114821 | A1 | 11/2006 |
| WO | 2007/083574 | A1 | 7/2007 |
| WO | 2007/083575 | A1 | 7/2007 |
| WO | 2007/086130 | A1 | 8/2007 |
| WO | 2007/094494 | A1 | 8/2007 |
| WO | 2007/097385 | A1 | 8/2007 |
| WO | 2007/102360 | A1 | 9/2007 |
| WO | 2007/105348 | A1 | 9/2007 |
| WO | 2007/109451 | A2 | 9/2007 |
| WO | 2007/119310 | A1 | 10/2007 |
| WO | 2007/125683 | A1 | 11/2007 |
| WO | 2007/138857 | A1 | 12/2007 |
| WO | 2008/007606 | A | 1/2008 |
| WO | 2008/081699 | A1 | 7/2008 |
| WO | 2008/126458 | A1 | 10/2008 |
| WO | 2008/133018 | A1 | 11/2008 |
| WO | 2008/140037 | A1 | 11/2008 |
| WO | 2008/142957 | A1 | 11/2008 |
| WO | 2009/008296 | A1 | 1/2009 |
| WO | 2009/011144 | A1 | 1/2009 |
| WO | 2009/011376 | A1 | 1/2009 |
| WO | 2009/011400 | A1 | 1/2009 |
| WO | 2009/011423 | A1 | 1/2009 |
| WO | 2009/081719 | A1 | 7/2009 |
| WO | 2009/110381 | A1 | 9/2009 |
| WO | 2009/128437 | A1 | 10/2009 |
| WO | 2010/017527 | A2 | 2/2010 |
| WO | 2010/026939 | A1 | 3/2010 |

(56) References Cited

FOREIGN PATENT DOCUMENTS

OTHER PUBLICATIONS

Official communication issued in counterpart Japanese Application No. 2008-103741, mailed on May 26, 2009.
Official communication issued in counterpart Japanese Application No. 2008-103742, mailed on May 26, 2009.
Official communication issued in International Application No. PCT/JP2008/050358, mailed on Mar. 25, 2008.
Official communication issued in International Application No. PCT/JP2008/050356, mailed on Mar. 25, 2008.
Osamura et al.: "Packaging Material With Electromagnetic Coupling Module," U.S. Appl. No. 12/536,663, filed Aug. 6, 2009.
Osamura et al.: "Packaging Material with Electromagnetic Coupling Module," U.S. Appl. No. 12/536,669, filed Aug. 6, 2009.
Dokai et al.: "Wireless IC Device and Component for Wireless IC Device," U.S. Appl. No. 12/543,553, filed Aug. 19, 2009.
Shioya et al.: "Wireless IC Device," U.S. Appl. No. 12/551,037, filed Aug. 31, 2009.
Ikemoto: "Wireless IC Device and Manufacturing Method Thereof," U.S. Appl. No. 12/579,672, filed Oct. 15, 2009.
Official communication issued in International Application No. PCT/JP2008/058614, mailed on Jun. 10, 2008.
Official Communication issued in International Patent Application No. PCT/JP2008/063025, mailed on Aug. 12, 2008.
Kato et al.: "Wireless IC Device," U.S. Appl. No. 12/603,608, filed Oct. 22, 2009.
Kato et al.: "Wireless IC Device," U.S. Appl. No. 12/688,072, filed Jan. 15, 2010.
Official Communication issued in International Patent Application No. PCT/JP2009/053693, mailed on Jun. 9, 2009.
Kato: "Composite Antenna," U.S. Appl. No. 12/845,846, filed Jul. 29, 2010.
Official Communication issued in International Patent Application No. PCT/JP2009/053690, mailed on Jun. 2, 2009.
Kato et al.: "Radio Frequency IC Device and Radio Communication System," U.S. Appl. No. 12/859,340, filed Aug. 19, 2010.
Official Communication issued in International Patent Application No. PCT/JP2009/055758, mailed on Jun. 23, 2009.
Kato et al.: "Wireless IC Device," U.S. Appl. No. 12/859,880, filed Aug. 20, 2010.
Official Communication issued in International Patent Application No. PCT/JP2009/057482, mailed on Jul. 21, 2009.
Kataya et al.: "Wireless IC Device, Electronic Apparatus, and Method for Adjusting Resonant Frequency of Wireless IC Device," U.S. Appl. No. 12/861,945, filed Aug. 24, 2010.
Kato: "Wireless IC Device and Electromagnetic Coupling Module," U.S. Appl. No. 12/890,895, filed Sep. 27, 2010.
Official Communication issued in International Patent Application No. PCT/JP2009/059410, mailed on Aug. 4, 2009.
Kato et al.: "Wireless IC Device" U.S. Appl. No. 12/902,174, filed Oct. 12, 2010.
Official Communication issued in International Patent Application No. PCT/JP2009/059259, mailed on Aug. 11, 2009.
Official Communication issued in corresponding Japanese Patent Application No. 2010-506742, mailed on Apr. 6, 2010.
Official Communication issued in International Patent Application No. PCT/JP2009/056698, mailed on Jul. 7, 2009.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
Official Communication issued in International Patent Application No. PCT/JP2009/069486, mailed on Mar. 2, 2010.
Kato: "Radio IC Device"; U.S. Appl. No. 13/080,775, filed Apr. 6, 2011.
Kato et al.: "Antenna and Wireless IC Device"; U.S. Appl. No. 13/083,626, filed Apr. 11, 2011.
Official Communication issued in International Patent Application No. PCT/JP2009/070617, mailed on Mar. 16, 2010.
Nagai, "Mounting Technique of RFID by Roll-To-Roll Process", Material Stage, Technical Information Institute Co., Ltd, vol. 7, No. 9, 2007, pp. 4-12.
Dokai et al.: "Wireless IC Device"; U.S. Appl. No. 13/088,480, filed Apr. 18, 2011.
Kato et al.: "High-Frequency Device and Wireless IC Device"; U.S. Appl. No. 13/094,928, filed Apr. 20, 2011.
Dokai et al.: "Wireless IC Device"; U.S. Appl. No. 13/099,392, filed May 3, 2011.
Kato et al.: "Radio Frequency IC Device"; U.S. Appl. No. 13/163,803, filed Jun. 20, 2011.
Official Communication issued in International Patent Application No. PCT/JP2010/050170, mailed on Apr. 13, 2010.
Official Communication issued in International Patent Application No. PCT/JP2010/051205, mailed on May 11, 2010.
Kato: "Wireless IC Device, Wireless IC Module and Method of Manufacturing Wireless IC Module"; U.S. Appl. No. 13/169,067, filed Jun. 27, 2011.
Kato et al.: "Antenna and Wireless IC Device"; U.S. Appl. No. 13/190,670, filed Jul. 26, 2011.
Shiroki et al.: "RFIC Chip Mounting Structure"; U.S. Appl. No. 13/223,429, filed Sep. 1, 2011.
Official Communication issued in International Patent Application No. PCT/JP2010/056559, mailed on Jul. 27, 2010.
Taniguchi et al.: "Antenna Device and Radio Frequency IC Device"; U.S. Appl. No. 13/232,102, filed Sep. 14, 2011.
Official communication issued in counterpart International Application No. PCT/JP2008/071502, mailed Feb. 24, 2009.
Kato et al.: "Wireless IC Device and Manufacturing Method Thereof," U.S. Appl. No. 12/432,854, filed Apr. 30, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device," U.S. Appl. No. 12/469,896, filed May 21, 2009.
Ikemoto et al.: "Wireless IC Device," U.S. Appl. No. 12/496,709, filed Jul. 2, 2009.
Official communication issued in counterpart International Application No. PCT/JP2008/062947, mailed Aug. 19, 2008.
Official communication issued in counterpart International Application No. PCT/JP2008/056026, mailed Jul. 1, 2008.
Ikemoto et al.: "Wireless IC Device and Electronic Apparatus," U.S. Appl. No. 12/503,188, filed Jul. 15, 2009.
Official communication issued in counterpart International Application No. PCT/JP2008/055567, mailed May 20, 2008.

(56) References Cited

OTHER PUBLICATIONS

Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device," U.S. Appl. No. 12/510,338, filed Jul. 28, 2009.
Kato et al.: "Wireless IC Device," U.S. Appl. No. 12/510,340, filed Jul. 28, 2009.
Kato: "Wireless IC Device," U.S. Appl. No. 12/510,344, filed Jul. 28, 2009.
Kato et al.: "Wireless IC Device," U.S. Appl. No. 12/510,347, filed Jul. 28, 2009.
Official Communication issued in corresponding United Kingdom Patent Application No. 1203353.6, mailed on Aug. 29, 2013.
Official Communication issued in International Patent Application No. PCT/JP2009/066336, mailed on Dec. 22, 2009.
Official Communication issued in corresponding Japanese Patent Application No. 2010-509439, mailed on Jul. 6, 2010.
Official Communication issued in corresponding Japanese Patent Application No. 2011-032311, mailed on Mar. 29, 2011.
Official Communication issued in corresponding Japanese Patent Application No. 2009-525327, drafted on Sep. 22, 2010.
Official Communication issued in corresponding Japanese Patent Application No. 2011-032311, mailed on Aug. 2, 2011.
Official Communication issued in corresponding Japanese Patent Application No. 2011-032312, mailed on Aug. 2, 2011.
Official Communication issued in corresponding Japanese Patent Application No. 2011-032311, mailed on Aug. 23, 2011.
Kato et al.: "Wireless IC Device Component and Wireless IC Device"; U.S. Appl. No. 13/241,823, filed Sep. 23, 2011.
Kato et al.: "Antenna Device and Method of Setting Resonant Frequency of Antenna Device"; U.S. Appl. No. 13/272,365, filed Oct. 13, 2011.
Official Communication issued in International Patent Application No. PCT/JP2010/056812, mailed on Jul. 13, 2010.
Dokai et al.: "Optical Disc"; U.S. Appl. No. 13/295,153, filed Nov. 14, 2011.
Official Communication issued in International Patent Application No. PCT/JP2010/057668, mailed on Aug. 17, 2010.
Osamura et al.: "Radio Frequency IC Device and Method of Manufacturing the Same"; U.S. Appl. No. 13/308,575, filed Dec. 1, 2011.
Official Communication issued in International Patent Application No. PCT/JP2010/069417, mailed on Dec. 7, 2010.
Kato: "Wireless IC Device and Coupling Method for Power Feeding Circuit and Radiation Plate"; U.S. Appl. No. 13/325,273, filed Dec. 14, 2011.
Official Communication issued in International Patent Application No. PCT/JP2010/053496, mailed on Jun. 1, 2010.
Ikemoto: "Wireless IC Tag, Reader-Writer, and Information Processing System"; U.S. Appl. No. 13/329,354, filed Dec. 19, 2011.
Kato et al.: "Antenna and Antenna Module"; U.S. Appl. No. 13/334,462, filed Dec. 22, 2011.
Official Communication issued in International Patent Application No. PCT/JP2010/069418, mailed on Feb. 8, 2011.
Official Communication issued in International Patent Application No. PCT/JP2010/063082, mailed on Nov. 16, 2010.
Ikemoto: "Communication Terminal and Information Processing System"; U.S. Appl. No. 13/412,772, filed Mar. 6, 2012.
"Antenna Engineering Handbook", The Institute of Electronics and Communication Engineers, Mar. 5, 1999, pp. 20-21.
Official Communication issued in International Patent Application No. PCT/JP2010/066714, mailed on Dec. 14, 2010.
Nomura et al.: "Antenna and Wireless IC Device"; U.S. Appl. No. 13/419,454, filed Mar. 14, 2012.
Official Communication issued in International Patent Application No. PCT/JP2010/070607, mailed on Feb. 15, 2011.
Ito: "Wireless IC Device and Method of Detecting Environmental State Using the Device"; U.S. Appl. No. 13/421,889, filed Mar. 16, 2012.
Official Communication issued in International Patent Application No. PCT/JP2011/053654, mailed on Mar. 29, 2011.
Kato et al.: "Antenna Device and Mobile Communication Terminal"; U.S. Appl. No. 13/425,505, filed Mar. 21, 2012.
Official Communication issued in International Patent Application No. PCT/JP2010/069416, mailed on Feb. 8, 2011.
Kato et al.: "Wireless Communication Device and Metal Article"; U.S. Appl. No. 13/429,465, filed Mar. 26, 2012.
Official Communication issued in International Patent Application No. PCT/JP2009/056934, mailed on Jun. 30, 2009.
Kato et al.: "Wireless IC Device"; U.S. Appl. No. 12/903,242, filed Oct. 13, 2010.
Kato et al.: "Wireless IC Device"; U.S. Appl. No. 12/940,103, filed Nov. 5, 2010.
Kato et al.: "Wireless IC Device System and Method of Determining Authenticity of Wireless IC Device"; U.S. Appl. No. 12/940,105, filed Nov. 5, 2010.
Official Communication issued in International Patent Application No. PCT/JP2009/059669, mailed on Aug. 25, 2009.
Official Communication issued in International Patent Application No. PCT/JP2009/062181, mailed on Oct. 13, 2009.
Official Communication issued in corresponding Japanese Application No. 2010-501323, mailed on Apr. 6, 2010.
Kato et al.: "Component of Wireless IC Device and Wireless IC Device"; U.S. Appl. No. 12/944,099, filed Nov. 11, 2010.
Kato et al.: Wireless IC Device and Manufacturing Method Thereof; U.S. Appl. No. 12/961,599, filed Dec. 7, 2010.
Kataya et al.: "Radio Frequency IC Device and Electronic Apparatus"; U.S. Appl. No. 12/959,454, filed Dec. 3, 2010.
Ikemoto et al.:"Radio IC Device"; U.S. Appl. No. 12/981,582, filed Dec. 30, 2010.
Official Communication issued in International Patent Application No. PCT/JP2009/062801, mailed on Oct. 27, 2009.
Ikemoto et al.: "Wireless IC Device and Electronic Apparatus"; U.S. Appl. No. 13/022,695, filed Feb. 8, 2011.
Official Communication issued in International Patent Application No. PCT/JP2009/067778, mailed on Jan. 26, 2010.
Kato: "Wireless IC Device and Method for Manufacturing Same"; U.S. Appl. No. 13/022,693, filed Feb. 8, 2011.
Kato: "Wireless IC Device"; U.S. Appl. No. 13/080,781, filed Apr. 6, 2011.
English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device"; U.S. Appl. No. 12/211,117, filed Sep. 16, 2008.
Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509, filed Apr. 26, 2007.
Kato et al.: "Product Including Power Supply Circuit Board"; U.S. Appl. No. 12/234,949, filed Sep. 22, 2008.
Kato et al.: "Data Coupler"; U.S. Appl. No. 12/252,475, filed Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Appl. No. 12/276,444, filed Nov. 24, 2008.
Dokai et al.: "Optical Disc"; U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.
Kato: "Wireless IC Device"; U.S. Appl. No. 11/964,185, filed Dec. 26, 2007.
Kato et al.: "Radio Frequency IC Device"; U.S. Appl. No. 12/336,629, filed Dec. 17, 2008.

(56) References Cited

OTHER PUBLICATIONS

Kato et al.: "Wireless IC Device and Component for Wireless IC Device"; U.S. Appl. No. 12/339,198, filed Dec. 19, 2008.
Ikemoto et al.: "Wireless IC Device"; U.S. Appl. No. 11/851,651, filed Sep. 7, 2007.
Kataya et al.: "Wireless IC Device and Electronic Device"; U.S. Appl. No. 11/851,661, filed Sep. 7, 2007.
Dokai et al.: "Antenna and Radio IC Device"; U.S. Appl. No. 12/350,307, filed Jan. 8, 2009.
Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399; mailed on Aug. 25, 2008.
Official Communication issued in corresponding Chinese Patent Application No. 201080046806.4, mailed on Jun. 23, 2014.
Official Communication issued in corresponding United Kingdom Patent Application No. 1203353.6, mailed on Jul. 14, 2014.

* cited by examiner

COMMUNICATION TERMINAL AND INFORMATION PROCESSING SYSTEM

BACKGROUND OF THE INVENTION

1. Field of the Invention

The present invention relates to a communication terminal, and, in particular, relates to a communication terminal available for an RFID (Radio Frequency Identification) system and an information processing system including the communication terminal.

2. Description of the Related Art

In the past, as a system for managing articles, there has been developed an RFID system that establishes, on the basis of a non-contact method, communication between a reader/writer generating an induction electromagnetic field and a wireless tag storing therein predetermined information assigned to an article, and transmits information. An example of an RFID system of this type is disclosed in Japanese Unexamined Patent Application Publication No. 2003-99184 and includes an information processing system where an RFID device in the form of a wireless IC tag is embedded within an input pen and when the RFID device and the information processing device including a reader/writer are located within a range within which communication is capable of being established, the information processing device reads out the information of the RFID device and recognizes a pen user or characters written using the pen.

However, since, in the above-mentioned information processing system, the RFID device in the form of the wireless IC tag and the reader/writer being located within a range within which communication is capable of being established is a required operating condition, and a communication distance for a high-frequency wave of an HF band or a UHF band is short, there has occurred a problem that it is possible to establish communication only at a very short distance.

In addition, in Japanese Unexamined Patent Application Publication No. 2001-240217, there is described an inventory management system that includes a plurality of handy terminals establishing communication with a base unit so as to manage inventory in a book shop. However, this handy terminal is a terminal embedding therein a battery and a signal processing circuit, and has a problem that the configuration thereof is complicated and the size thereof is large.

SUMMARY OF THE INVENTION

Therefore, preferred embodiments of the present invention provide a communication terminal and an information processing system, which are capable of lengthening a communication distance between a reader/writer and a wireless IC tag on the basis of a simple configuration.

A communication terminal according to a first preferred embodiment of the present invention includes a first antenna unit, a second antenna unit, and a connection unit configured to electrically connect the first antenna unit and the second antenna unit to each other, wherein each of the first antenna unit and the second antenna unit operates with a signal used in one information processing system, and a signal received by the first antenna unit is transmitted from the second antenna unit, and a signal received by the second antenna unit is transmitted from the first antenna unit.

An information processing system according to a second preferred embodiment of the present invention includes a reader/writer, a communication terminal, and a wireless IC tag, wherein the communication terminal includes a first antenna unit, a second antenna unit, and a connection unit configured to electrically connect the first antenna unit and the second antenna unit to each other, wherein the first antenna unit communicates with the reader/writer, the second antenna unit communicates with the wireless IC tag, and information stored in the wireless IC tag is read using the reader/writer.

In the communication terminal, the first antenna unit and the second antenna unit are electrically connected to each other, the first antenna unit communicates with the reader/writer, and the second antenna unit communicates with the wireless IC tag. Since the communication terminal serves as an intermediary between the reader/writer and the wireless IC tag, even if the reader/writer and the wireless IC tag are spaced apart by a long distance at which it is not possible to establish communication based only on the reader/writer and the wireless IC tag, it is possible to establish communication. In addition, a battery and an information processing circuit are unnecessary for the communication terminal, and it is possible to simply configure the communication terminal.

According to various preferred embodiments of the present invention, since the communication terminal serves as an intermediary between the wireless IC tag and the reader/writer, it is possible to lengthen a communication distance.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of a communication terminal and an information processing system according to the present invention will be described with reference to accompanying drawings. In addition, in each drawing, a common symbol is assigned to a same component or a same portion, and redundant description will be omitted.

First Preferred Embodiment

Figure 1:
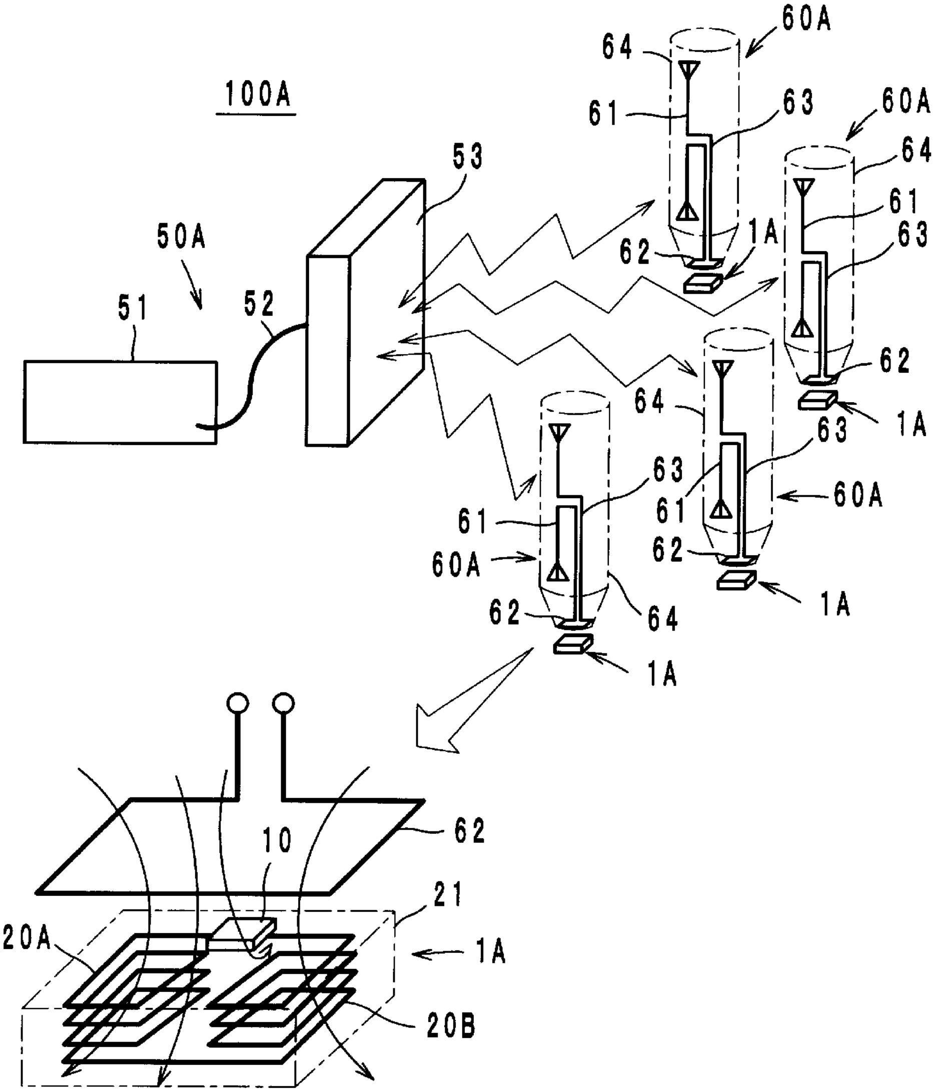
FIG. 1 is a perspective view illustrating an information processing system according to a first preferred embodiment of the present invention.

As illustrated in FIG. 1, an information processing system 100A according to a first preferred embodiment includes a reader/writer 50A, a plurality of communication terminals 60A, and a wireless IC tag 1A. The reader/writer 50A includes a main body 51 including an information processing circuit and the like and an electric field-type antenna 53 connected to the main body 51 through a signal line 52.

The communication terminal 60A preferably is a pen-shaped reader/writer, and includes a first antenna unit 61, a second antenna unit 62, and a connection unit 63 electrically connecting the first and second antenna units 61, 62 to each other. In addition, these components are housed within a cylindrical housing 64, and the second antenna unit 62 is disposed in the leading end portion of the housing 64. The first antenna unit 61 preferably is an electric field-type dipole antenna, and is coupled to the antenna 53 of the reader/writer 50A due to an electric field. The second antenna unit 62 preferably is a magnetic field-type loop antenna, and, as described hereinafter, is coupled to the coiled antennae 20A and 20B of the wireless IC tag 1A through a magnetic field. The second antenna unit 62 preferably has a loop shape whose area is approximately equal to an area obtained by joining the antennae 20A and 20B of the wireless IC tag 1A together.

The wireless IC tag 1A includes a wireless IC chip 10 processing a transmission/reception signal of a predetermined frequency and two coiled antennae 20A and 20B. The wireless IC chip 10 preferably includes a clock circuit, a logic circuit, a memory circuit, and the like. In addition, in the wireless IC chip 10, necessary information is stored, and a pair of input-output terminal electrodes (not illustrated) is provided on the rear surface of the wireless IC chip 10.

The coiled antennae 20A and 20B are obtained by winding conductors in a coil shape, one end of each thereof is electrically connected to the input-output terminal electrode of the wireless IC chip 10, and the other ends thereof are electrically connected to each other. The winding axes of these antennae 20A and 20B are disposed at positions different from each other in planar view, and the winding directions thereof are equal to each other. As described hereinafter with reference to FIG. 2, the antennae 20A and 20B are configured by laminating a plurality of coil conductors in a substrate 21, and the wireless IC chip 10 is mounted on the substrate 21.

In this information processing system 100A, a high-frequency wave (of an HF band, a UHF band, or a high-frequency band greater than or equal to the UHF band) radiated from the antenna 53 of the reader/writer 50A is received by the first antenna unit 61 of the communication terminal 60A, and transmitted to the second antenna unit 62 through the connection unit 63. In addition, by causing the second antenna unit 62 disposed in the leading end portion of the housing 64 to be adjacent to the wireless IC tag 1A, a magnetic flux based on a signal of a predetermined frequency radiated from the second antenna unit 62 penetrates through the coiled antennae 20A and 20B, and hence currents flow in the antennae 20A and 20B. Specifically, the second antenna unit 62 and the antennae 20A and 20B are electromagnetically coupled to each other. This current is supplied to the wireless IC chip 10 to cause the wireless IC chip 10 to operate.

On the other hand, a response signal from the wireless IC chip 10 is radiated from the coiled antennae 20A and 20B to the second antenna unit 62, and the signal is supplied to the first antenna unit 61 through the connection unit 63, received by the antenna 53 of the reader/writer 50A, and read by the main body 51.

Since, in the present first preferred embodiment, each of the first antenna unit 61 and the second antenna unit 62 operates with a signal used in one information processing system 100A such as a UHF band RFID system, for example, and the communication terminal 60A serves as an intermediary between the reader/writer 50A and the wireless IC tag 1A, even if the reader/writer 50A and the wireless IC tag 1A are spaced from each other by a long distance at which it is not possible to establish communication based only on the reader/writer 50A and the wireless IC tag 1A, it is possible to establish communication. In particular, since the antenna 53 of the reader/writer 50A and the first antenna unit 61 of the communication terminal 60A are coupled to each other through an electric field, it is possible to establish communication at a relatively long distance. In addition, an existing electric field-type antenna is available for the antenna 53 of the reader/writer 50A. In addition, since the antennae 20A and 20B of the wireless IC tag 1A and the second antenna unit 62 are coupled to each other through a magnetic field, the attenuation of the magnetic field is larger than an electric field and communication is established at a short distance. Therefore, even if a plurality of wireless IC tags 1A exist, it is possible to reliably read a specific tag 1A. In addition, since the communication terminal 60A is wirelessly coupled to the reader/writer 50A, it is possible to simultaneously read a plurality of wireless IC tags 1A using a plurality of communication terminals 60A.

The connection between the first antenna unit 61 and the second antenna unit 62 is subjected to a direct current connection by the connection unit 63, and it is possible to effectively transmit a signal. In this regard, however, the connection between both thereof may also be a wireless connection such as electromagnetic field coupling. In addition, the communication terminal 60A is configured by the antenna units 61 and 62 and the connection unit 63, a power source for driving, such as a battery, the peripheral circuit thereof, and furthermore, a wireless communication device such as Bluetooth (trademark) are not necessary, and it is possible to cause the communication terminal 60A to be downsized and inexpensive. Furthermore, since the second antenna unit 62 is disposed in the leading end portion of the chassis 64, it is possible to easily couple the first antenna unit 61 and the second antenna unit 62 to each other.

The communication terminal 60A preferably is of a pen type, and caused to be adjacent to the wireless IC tag 1A to be a target of reading, with the housing 64 being held by a hand, and hence the communication terminal 60A establishes communication with the wireless IC chip 10. In some cases, a human body also functions as an antenna coupled to an electric field. Accordingly, when the first antenna unit 61 is disposed in a portion to be held in fingers, the human body also functions as an antenna, and the sensitivity of the first antenna unit 61 is improved.

The pen-type housing 64 of the communication terminal 60A not only simply includes a function as the communication terminal of the RFID system but also may be configured as an article having an actual function. For example, the communication terminal 60A itself may also be a ball-point pen or a mobile phone.

As for the wireless IC tag 1A, since the winding directions of the coiled antennae 20A and 20B are equal to each other, currents occurring in the individual antennae 20A and 20B do not cancel out each other, and an energy transmission efficiency is improved. Specifically, a communication distance between the second antenna unit 62 and the antennae 20A and 20B is lengthened. In addition, the antennae 20A and 20B are preferably provided in a laminated structure, and the individual coil conductors thereof are preferably located at positions at which the coil conductors overlap with each other as seen in a planar view. Accordingly, since it is possible to enlarge the opening areas of the coils, and cross fluxes increase, the communication distance further increases.

It is desirable that an imaginary portion of the impedance of the wireless IC chip 10 and imaginary portions of the impedances of the coiled antennae 20A and 20B have conjugate relations with each other at the frequency of a signal used for communication. Specifically, it is desirable that the resonance frequencies of the coiled antennae 20A and 20B are located near an operation frequency. It is further desirable that real portions of the impedances coincide with each other.

In particular, when the coiled antennae 20A and 20B are of a lamination type and have large aperture portions, it is possible to obtain large inductance values with the sizes thereof being small, and furthermore the wireless IC tag 1A itself is downsized. By setting the operation frequency to a short wavelength in the vicinity of 950 MHz, the wireless IC tag 1A is further downsized. When the frequency of a UHF band is used for communication, the wireless IC tag 1A may be put into a size that is about 3.2 mm long, about 1.6 mm wide, and about 0.5 mm tall, for example.

Figure 2:
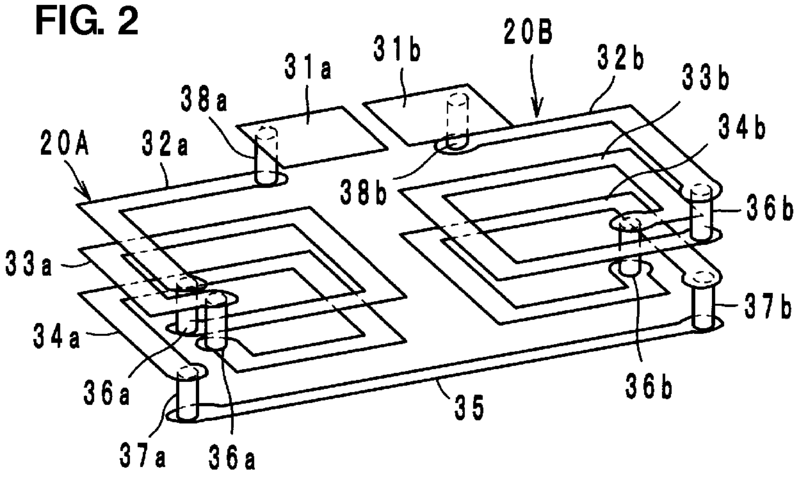
FIG. 2 is a perspective view illustrating a laminated structure of a coiled antenna of a wireless IC tag.

Here, an example of the laminated structure of the coiled antennae 20A and 20B will be described with reference to FIG. 2. The substrate 21 is obtained preferably by forming and laminating electrodes, conductors, and via hole conductors in a plurality of sheets. Electrodes 31*a* and 31*b* to be connected to the input-output terminal electrodes of the wireless IC chip 10 are provided in the first layer, coil conductors 32*a*, 32*b*, 33*a*, 33*b*, 34*a*, and 34*b* are provided in the second layer to the fourth layer, and a connection coil conductor 35 is provided in the fifth layer. The coil conductors 32*a*, 32*b* to 34*a*, and 34*b* are connected in a coil shape through via hole conductors 36*a* and 36*b*, thereby defining the antennae 20A and 20B, and the other ends of the antennae 20A and 20B are connected to both end portions of the coil conductor 35 through via hole conductors 37*a* and 37*b*. In addition, one end of the antenna 20A and one end of the antenna 20B are connected to the electrodes 31*a* and 31*b* through via hole conductors 38*a* and 38*b*.

While each sheet in the substrate 21 may be formed using a popular resin whose electric permittivity ranges from 3 to 4, for example, it is desirable that the substrate 21 is formed using material whose electric permittivity is higher than that. An example is a ceramic having an electric permittivity that is greater than or equal to 7.

When a lamination type is adopted as the coiled antennae 20A and 20B, it is possible to achieve the stability of an operation in addition to enlarging the aperture portion. Specifically, since capacitance between the coil conductors is dependent on the quality of material between the coil conductors (the quality of the material of the sheet), the influence of the electric permittivity of the attachment target article of the wireless IC tag 1A is reduced (the fluctuation of stray capacitance is less likely to occur), and the change of the inductance value of the coil is small. Therefore, the change of the resonance frequency is small, and the communication distance is stabilized. In particular, by using material of a high electric permittivity for the substrate 21, the impedance of the coil within the substrate 21 is nearly determined, and becomes unsusceptible to a usage environment.

Figure 3:
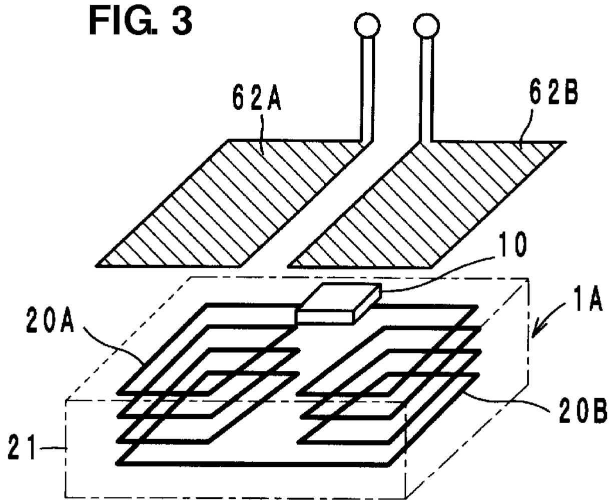
FIG. 3 is a perspective view illustrating an example of a modification 1 to a second antenna unit of a communication terminal.

Since the second antenna unit in the communication terminal may preferably have various shapes, examples of modifications 1 to 4 thereto will be illustrated hereinafter. First, the second antenna unit may be electric field-type antennae 62A and 62B that do not have a loop shape but preferably have a flat plate-shaped configuration, as illustrated in FIG. 3. Since the coiled antennae 20A and 20B of the wireless IC tag 1A are separated into two portions, a potential difference occurs between the individual antennae 20A and 20B and an electric field is generated. Therefore, it is possible to cause even the flat plate-shaped electric field-type antennae 62A and 62B to operate. In addition, when the electric field-type antennae 62A and 62B are used as the second antenna unit, an electric field-type antenna may also be used as the antenna of the wireless IC tag.

Figure 4:
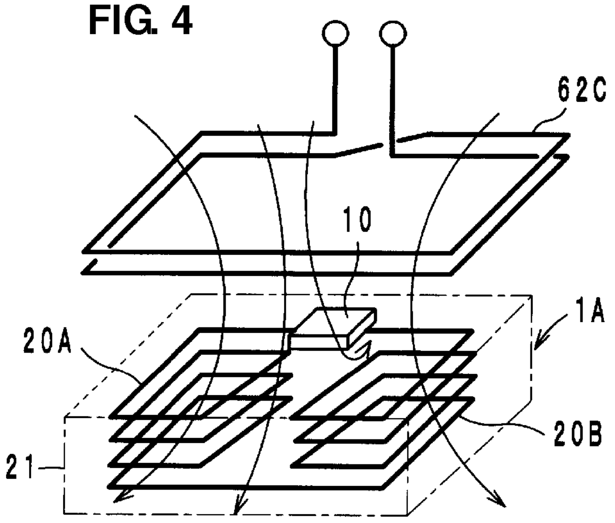
FIG. 4 is a perspective view illustrating an example of a modification 2 to the second antenna unit of the communication terminal.

As illustrated in FIG. 4, the second antenna unit may also be a magnetic field-type antenna 62C that has a loop shape including a plurality of turns. Since the intensity of a magnetic field is strengthened, it is possible to lengthen the communication distance.

Figure 5:
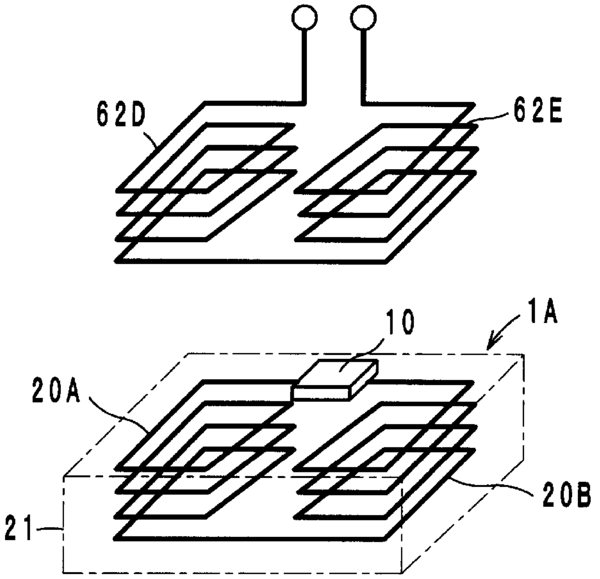
FIG. 5 is a perspective view illustrating an example of a modification 3 to the second antenna unit of the communication terminal.

As illustrated in FIG. 5, in the same way as the above-mentioned coiled antennae 20A and 20B, the second antenna unit may be configured by a first coiled antenna unit 62D and a second coiled antenna unit 62E. One end of the coiled antenna unit 62D and one end of the coiled antenna unit 62E are electrically connected to the first antenna unit 61 through the connection unit 63, and the other ends thereof are electrically connected to each other. In addition, the winding axes of the antenna units 62D and 62E are disposed at positions different from each other in planar view, and the winding directions thereof are equal to each other.

Since the winding directions of the coiled antenna units 62D and 62E are preferably equal to each other, and the coiled antenna units 62D and 62E have the same function effects as the coiled antennae 20A and 20B, it is possible to improve an energy transmission efficiency at the time of communication with the wireless IC tag 1A, and it is possible to lengthen the communication distance. In addition, it contributes to the downsizing of the communication terminal 60A. In addition, when the antennae 62D and 62E of the example of the modification 3 are used, it is not necessary to use two coiled antennae as the wireless IC tag.

Figure 6:
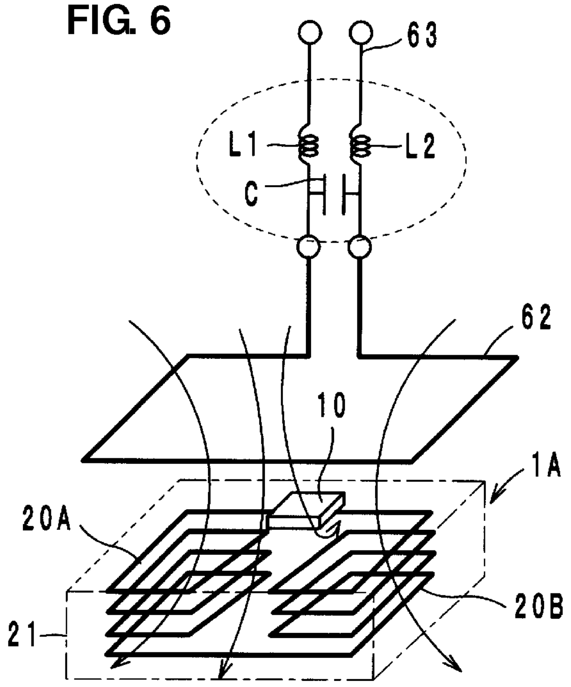
FIG. 6 is a perspective view illustrating an example of a modification 4 to the second antenna unit of the communication terminal.

As illustrated in FIG. 6, a matching circuit including inductances L1 and L2 and a capacitance C may also be provided in the connection unit 63 (for example, between the second antenna unit 62 and the first antenna unit 61). Since it is possible to establish the matching of impedance at an operation frequency, the energy transmission efficiency between the first antenna unit 61 and the second antenna unit 62 is improved, and it is possible to lengthen the communication distance even with small electric power. In addition, as the matching circuit, a circuit configuration other than that illustrated in FIG. 6 may also be adopted.

Figure 7:
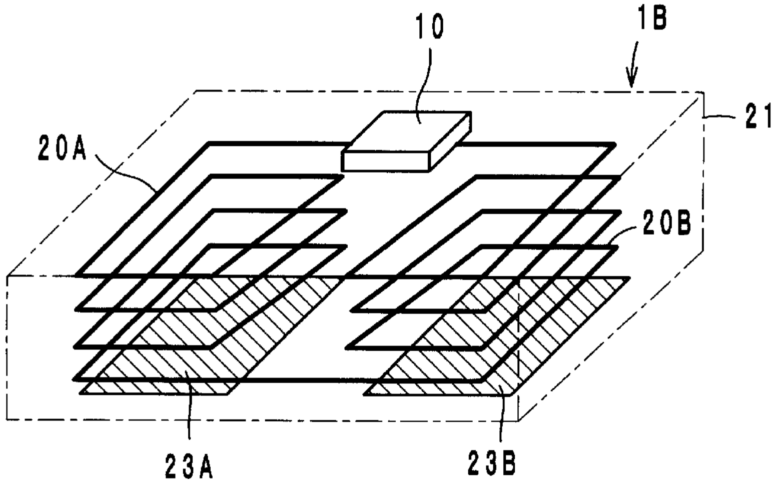
FIG. 7 is a perspective view illustrating an example of a modification 1 to the wireless IC tag.

Next, various kinds of examples of modifications to the wireless IC tag will be described. A wireless IC tag 1B illustrated in FIG. 7 is obtained by providing external electrodes 23A and 23B facing the antennae 20A and 20B, respectively, on the surface (bottom surface) of the substrate in which the antennae 20A and 20B are embedded. The other configuration is the same as the wireless IC tag 1A. By providing the external electrodes 23A and 23B, it is possible to solder-mount the wireless IC tag 1B to an article such as a printed circuit board or other suitable device.

Figure 8:
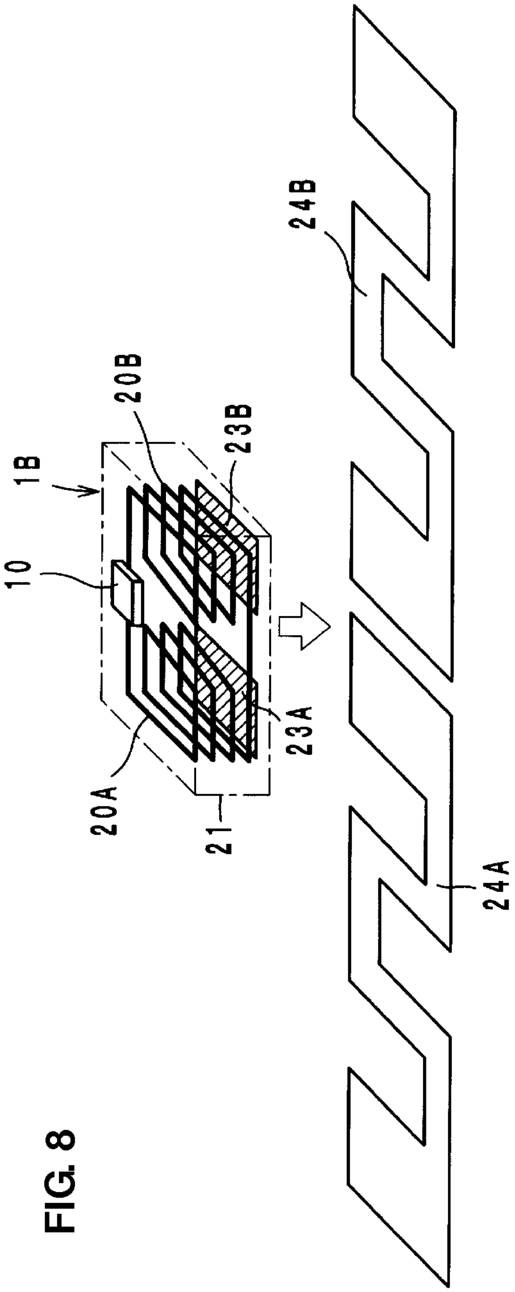
FIG. 8 is a perspective view illustrating the wireless IC tag illustrated in FIG. 7 and a booster antenna.

In addition, as illustrated in FIG. 8, as for the wireless IC tag 1B, meander-shaped booster antennae 24A and 24B may also be connected to the external electrodes 23A and 23B. While the booster antennae 24A and 24B are preferably of an electric field radiation-type, the booster antennae 24A and 24B may also be loop-shaped booster antennae of a magnetic field radiation type.

Figure 9A:
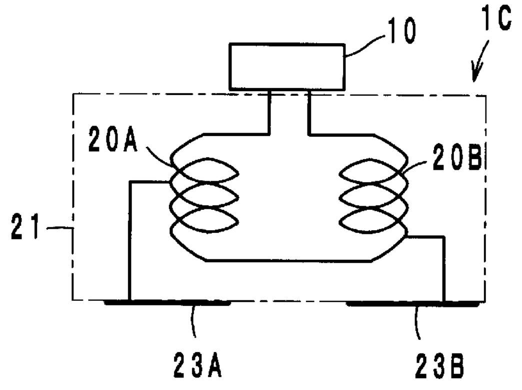
FIGS. 9A and 9B are equivalent circuit diagrams illustrating examples of modifications 2 and 3 to the wireless IC tag.
Figure 9B:
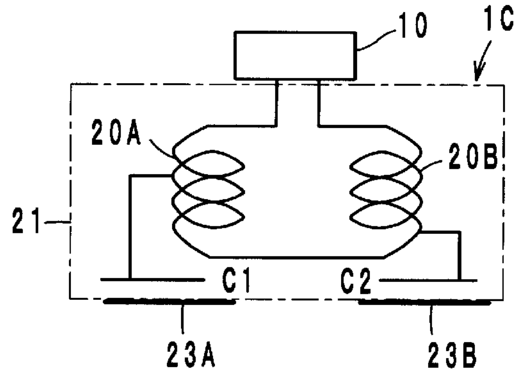

A wireless IC tag 1C illustrated in FIG. 9A is obtained by electrically connecting the external electrodes 23A and 23B provided in the above-mentioned wireless IC tag 1B to the coiled antennae 20A and 20B. In addition, as illustrated in FIG. 9B, capacitances C1 and C2 may also be generated between the external electrodes 23A and 23B and the coiled antennae 20A and 20B.

As illustrated in FIG. 9A, when the external electrodes 23A and 23B are electrically directly connected to the coiled antennae 20A and 20B, it is possible to simply determine a relationship between the electric potentials of the two, and it is possible to easily design the impedances of the external electrodes 23A and 23B to be various values. In addition, as illustrated in FIG. 9B, when being connected through capacitances C1 and C2, since the external electrodes 23A and 23B are not directly connected to the wireless IC chip 10, it is possible to protect the wireless IC chip 10 against the invasion of static electricity.

Figure 10:
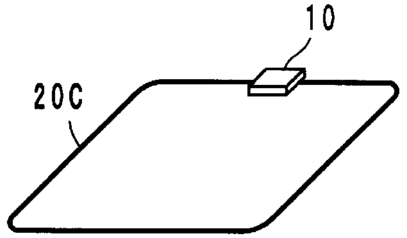
FIG. 10 is a perspective view illustrating an example of a modification 4 to the wireless IC tag.
Figure 11:
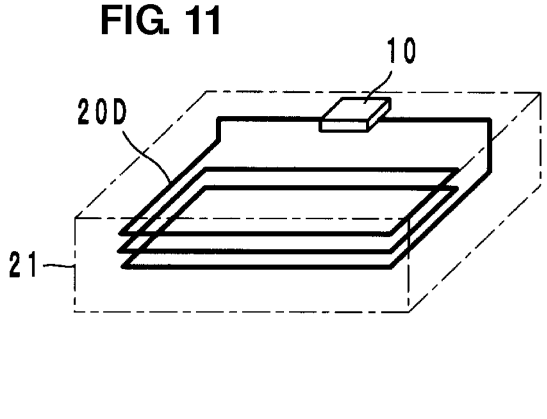
FIG. 11 is a perspective view illustrating an example of a modification 5 to the wireless IC tag.
Figure 12:
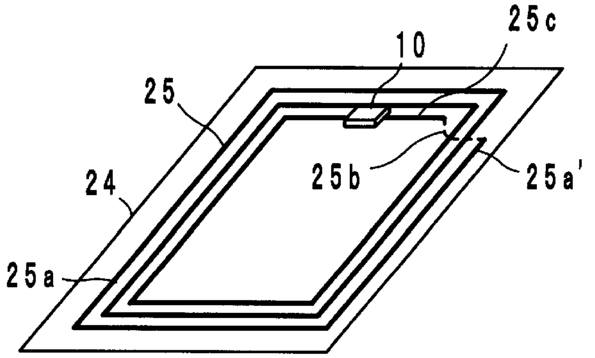
FIG. 12 is a perspective view illustrating an example of a modification 6 to the wireless IC tag.

In addition, the antenna of the wireless IC tag may not include two coiled antennae but may also be one coiled antenna 20C of one turn as illustrated in FIG. 10, for example. As illustrated in FIG. 11, the antenna of the wireless IC tag may also be one coiled antenna 20D of a plurality of turns. Furthermore, as illustrated in FIG. 12, the antenna of the wireless IC tag may also be a coiled antenna 25 provided on the front and rear surfaces of a sheet of film 24. Specifically, a coil conductor 25*a* wound more than once may be provided on the front surface of the film 24, the end portion 25*a*' thereof may be exposed on the rear surface of the film 24 and connected to the coil conductor 25*b*, and the coil conductor 25*b* may be exposed on the front surface of the film 24 and connected to the coil conductor 25*c*.

In addition, while not illustrated, the winding numbers of the antennae 20A and 20B of the wireless IC tag may also be different from each other, and the sizes thereof may also be different from each other. In addition, the number of coiled antennae may also be more than two. For example, another coiled antenna may also be arranged between the coiled antennae 20A and 20B.

Figure 13:
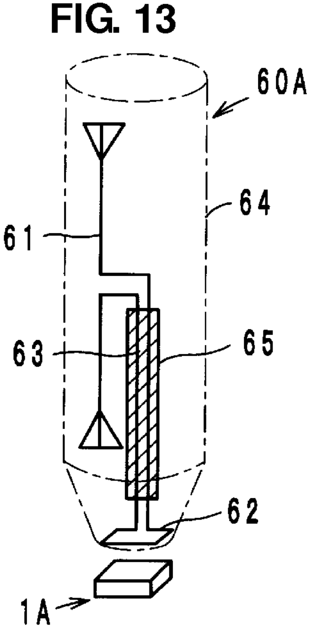
FIG. 13 is a perspective view illustrating an example of a modification 1 to the communication terminal.

As for the above-mentioned communication terminal 60A, as illustrated in FIG. 13, the connection unit 63 may also be coated using a ferrite material 65, for example. The line of the connection unit 63 or another ground conductor becomes part of the electric field-type antenna, and influences a radiation characteristic in some cases. By coating the connection unit 63 using the ferrite material 65, it is possible to isolate the first antenna unit 61 and the second antenna unit 62 from each other, and it is possible to cause the first antenna unit 61 of an electric field type to have a radiation characteristic according to design.

Figure 14:
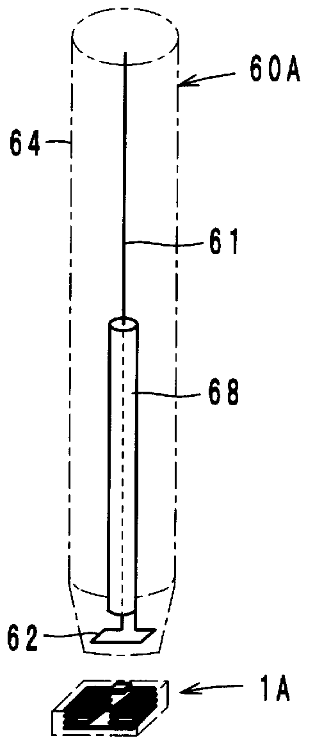
FIG. 14 is a perspective view illustrating an example of a modification 2 to the communication terminal.

As for the above-mentioned communication terminal 60A, as illustrated in FIG. 14, the first antenna unit 61 may also be an electric field-type monopole antenna. The lower half of the first antenna unit 61 preferably is configured as a coaxial line covered by a cylindrical ground electrode 68, one end of the loop-shaped second antenna unit 62 is connected to the lower end of the first antenna unit 61, and the other end thereof is connected to the ground electrode 68.

Since, unlike the above-mentioned dipole antenna, the monopole antenna preferably includes only one conductor, it is possible to simply configure the thin communication terminal 60A and it is possible to reduce manufacturing costs. In addition, since the lower half is covered by the ground electrode 68, even if the lower half is held in a hand of a user, the change of a characteristic as an antenna is small.

Second Preferred Embodiment

Figure 15:
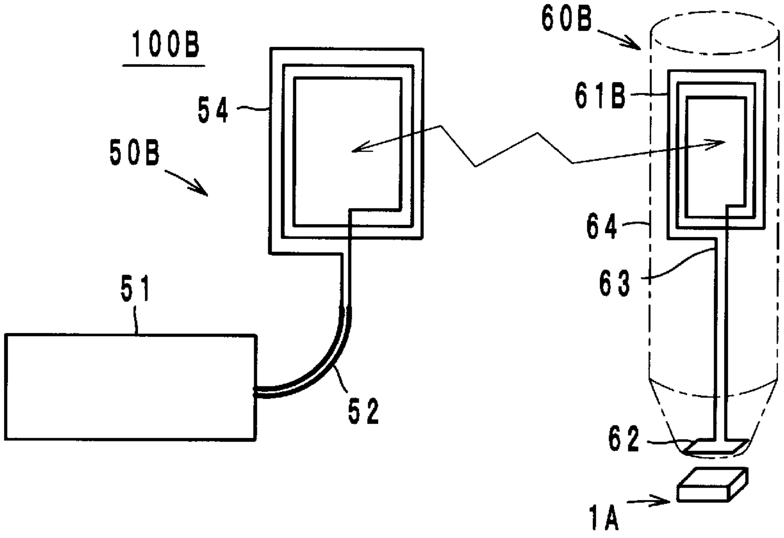
FIG. 15 is a perspective view illustrating an information processing system according to a second preferred embodiment of the present invention.

As illustrated in FIG. 15, an information processing system 100B according to a second preferred embodiment includes a reader/writer 50B including a magnetic field-type loop antenna 54, a communication terminal 60B in which the first antenna unit is a magnetic field-type loop antenna 61B, and the wireless IC tag 1A. The other configuration is preferably the same or substantially the same as the information processing system 100A, and the function effect thereof is also same. In particular, in this information processing system 100B, it is also possible to cause a magnetic field-type antenna to operate as the antenna of the reader/writer.

Third Preferred Embodiment

Figure 16A:
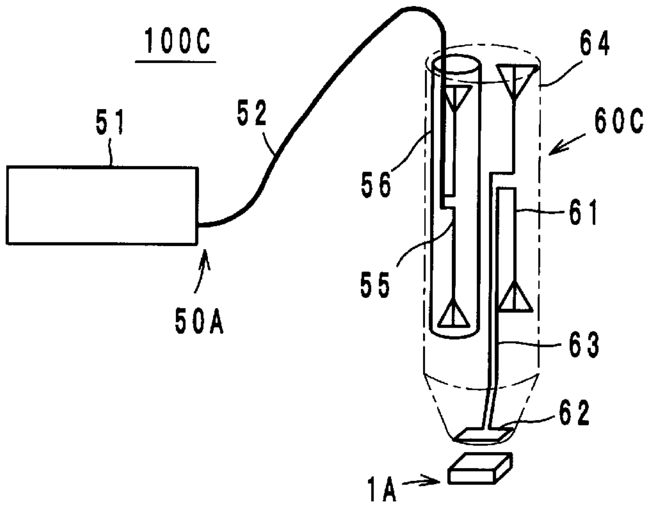
FIGS. 16A and 16B are perspective views illustrating an information processing system according to a third preferred embodiment of the present invention.
Figure 16B:
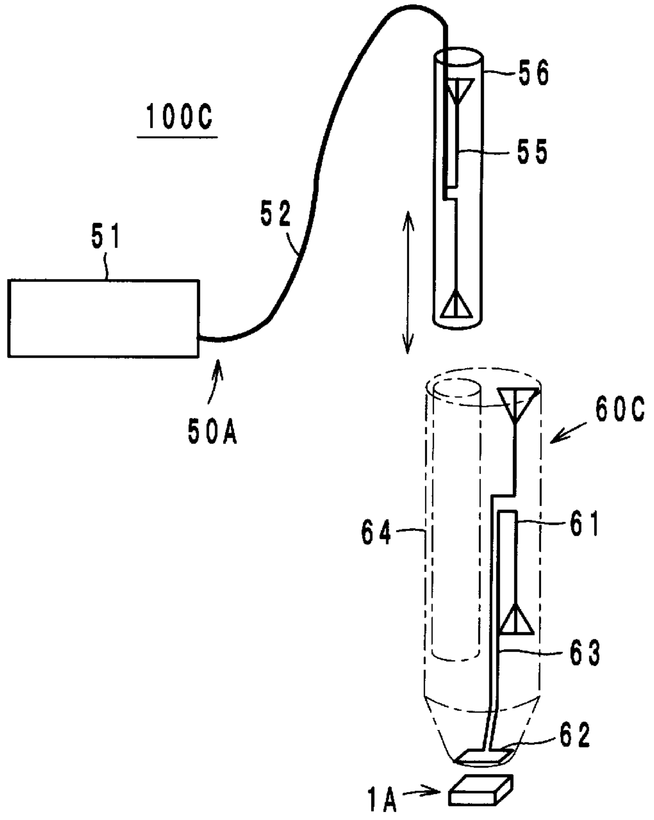

As illustrated in FIGS. 16A and 16B, in an information processing system 100C according to a third preferred embodiment, an antenna 55 of the reader/writer 50A is housed within a holder as a small antenna of an electric field type, and it is possible to insert the antenna 55 into the housing 64 of a communication terminal 60C so that the antenna 55 is adjacent to the first antenna unit 61. As illustrated in FIG. 16A, by placing the antenna 55 in the communication terminal 60C, it is possible to reliably establish communication in a state in which the antenna 55 and the first antenna unit 61 are adjacent to each other. On the other hand, as illustrated in FIG. 16B, by extracting the antenna 55 from the communication terminal 60C, it is possible to establish communication at a distant point in the same way as in the information processing system 100A.

In addition, by also downsizing and housing the main body 51 of the reader/writer 50 within the holder 56 or attaching the main body 51 of the reader/writer 50 to the chassis 64, the reader/writer 50 and the communication terminal 60C may also be integrated with each other.

Fourth Preferred Embodiment

Figure 17:
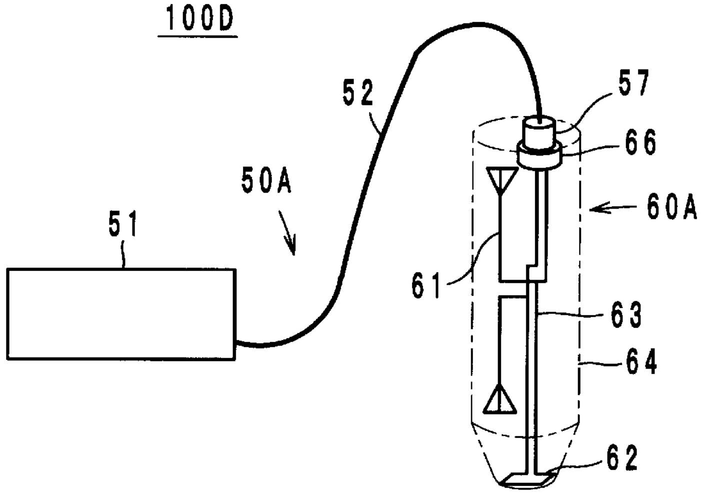
FIG. 17 is a perspective view illustrating an information processing system according to a fourth preferred embodiment of the present invention.

As illustrated in FIG. 17, in an information processing system 100D according to a fourth preferred embodiment, a connector 57 is connected to the leading end of the signal line 52 of the reader/writer 50A, and it is possible to attach and remove the connector 57 to and from a receptor 66 connected to the extended portion of the connection unit 63.

By connecting the connector 57 to the receptor 66, it is also possible to connect the reader/writer 50A and the communication terminal 60A to each other using a wired line, and it is possible to stably establish communication.

Other Preferred Embodiments

In addition, a communication terminal and an information processing system according to the present invention are not limited to the above-mentioned preferred embodiments, and it should be understood that it is possible to make various modifications without departing the scope thereof.

For example, while, in the above-mentioned preferred embodiments, the wireless IC chip preferably is mounted on the substrate in which the antenna is provided, the wireless IC chip may also be mounted within the substrate. In addition, the antenna may also be provided in the rewiring layer of the wireless IC chip. In addition, an information processing system targeted by this communication terminal is not limited to the UHF band RFID system, and may also be another communication system such as an HF band RFID system or the like.

As described above, preferred embodiments of the present invention are applicable to a communication terminal and an information processing system, and in particular, preferred embodiments of the present invention are superior in terms of lengthening the communication distance between the reader/writer and the wireless IC tag.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A communication terminal comprising:

a first antenna unit;

a second antenna unit;

a connection unit configured to electrically connect the first antenna unit and the second antenna unit to each other; and a hand-held housing; wherein each of the first antenna unit and the second antenna unit operates with a signal used in one information processing system; and the signal received by the first antenna unit is transmitted from the second antenna unit, and the signal received by the second antenna unit is transmitted from the first antenna unit without using a battery; and the first antenna unit is a far field dipole antenna wirelessly coupled to a reader/writer, and the second antenna unit is a near field loop antenna wirelessly coupled to a wireless IC tag;

and the first antenna unit is located at a trailing end portion of the hand-held housing and the second antenna unit is located at a leading end portion of the hand-held housing opposite to the trailing end portion of the hand-held housing;

wherein the first antenna unit, the second antenna unit, and the connection unit are housed in the hand-held housing.

2. The communication terminal according to claim 1, wherein the connection unit further includes a matching circuit.

3. The communication terminal according to claim 1, wherein the connection unit is subjected to a direct current connection.

4. The communication terminal according to claim 1, wherein the connection unit is coated by ferrite.

5. The communication terminal according to claim 1, wherein the hand-held housing has a cylindrical shape.

6. An information processing system comprising:

a reader/writer;

at least one communication terminal; and a plurality of wireless IC tags; wherein the at least one communication terminal includes a first antenna unit, a second antenna unit, a connection unit configured to electrically connect the first antenna unit and the second antenna unit to each other, and a hand-held housing; wherein the first antenna unit communicates with the reader/writer;

the second antenna unit communicates with one of the plurality of wireless IC tags; and information stored in the one of the plurality of wireless IC tags is read using the reader/writer; and the first antenna unit is a far field antenna wirelessly coupled to the reader/writer, and the second antenna unit is a near field antenna wirelessly coupled to the one of the plurality of wireless IC tags;

the first antenna unit is located at a trailing end portion of the hand-held housing and the second antenna unit is located at a leading end portion of the hand-held housing opposite to the trailing end portion of the hand-held housing; and the second antenna unit selectively communicates with the one of the plurality of wireless IC tags by placing the leading end portion of the hand-held housing closer to the one of the plurality of wireless IC tags than to remaining ones of the plurality of wireless IC tags;

wherein the first antenna unit, the second antenna unit, and the connection unit are housed in the hand-held housing.

7. The information processing system according to claim 6, wherein the at least one communication terminal includes a plurality of communication terminals.

8. The information processing system according to claim 6, wherein an antenna of the reader/writer and the first antenna unit are disposed within the hand-held housing so as to face each other.

9. The information processing system according to claim 8, wherein the antenna of the reader/writer is adapted to be attached and removed to and from the hand-held housing.

10. The information processing system according to claim 8, wherein the hand-held housing has a cylindrical shape.

* * * * *